US012431283B2

(12) United States Patent
Yen

(10) Patent No.: US 12,431,283 B2

(45) Date of Patent: Sep. 30, 2025

(54) INDUCTOR DEVICE

(71) Applicant: Realtek Semiconductor Corporation, Hsinchu (TW)

(72) Inventor: Hsiao-Tsung Yen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 751 days.

(21) Appl. No.: 17/659,331

(22) Filed: Apr. 14, 2022

(65) Prior Publication Data

US 2023/0114086 A1 Apr. 13, 2023

(30) Foreign Application Priority Data

Oct. 12, 2021 (TW) ................................ 110137793

(51) Int. Cl.

*H01F 27/28* (2006.01)
*H01F 5/00* (2006.01)
*H01F 5/06* (2006.01)
*H01F 27/40* (2006.01)

(52) U.S. Cl.

CPC ............... *H01F 27/40* (2013.01); *H01F 5/00* (2013.01); *H01F 5/06* (2013.01); *H01F 27/28* (2013.01)

(58) Field of Classification Search

CPC .... H01F 27/40; H01F 27/28; H01F 2021/125; H01F 21/12

USPC .................................. 336/83, 192, 200, 232

See application file for complete search history.

(56) References Cited

U.S. PATENT DOCUMENTS

| | | | | |
|---|---|---|---|---|
| 8,842,410 | B2 * | 9/2014 | Chan | H01F 21/12 307/37 |
| 10,128,033 | B2 | 11/2018 | Yen et al. | |
| 2007/0052512 | A1 | 3/2007 | Jeon et al. | |
| 2008/0129434 | A1 | 6/2008 | Khajehpour | |
| 2011/0051308 | A1 | 3/2011 | Chan | |
| 2017/0237292 | A1 * | 8/2017 | Jeong | B60L 53/122 307/104 |
| 2019/0279809 | A1 | 9/2019 | Yen | |

FOREIGN PATENT DOCUMENTS

| | | | |
|---|---|---|---|
| CN | 1551252 | A | 12/2004 |
| CN | 102376414 | A | 3/2012 |
| JP | 2007-5498 | A | 1/2007 |
| TW | I748846 | B | 12/2021 |

OTHER PUBLICATIONS

Yen, Hsiao-Tsung, "Inductor Device" , TW Patent Application Serial No. 110140459, Filed on Oct. 29, 2021.

* cited by examiner

*Primary Examiner* — Tuyen T Nguyen

(74) *Attorney, Agent, or Firm* — CKC & Partners Co., LLC

(57) ABSTRACT

An inductor device is disclosed. The inductor device includes a first ring structure and a second ring structure. The second ring structure is disposed within the first ring structure and paralleled to the first ring structure. A first open end of the first ring structure and a first open end of the second ring structure are selectively connected or unconnected.

10 Claims, 5 Drawing Sheets

INDUCTOR DEVICE

CROSS-REFERENCE TO RELATED APPLICATION

This application claims the priority benefit of TAIWAN Application serial no. 110137793, filed Oct. 12, 2021, the full disclosure of which is incorporated herein by reference.

FIELD OF INVENTION

The invention relates to an inductor device. More particularly, the invention relates to a differential inductor device.

BACKGROUND

Various types of existing inductors have their advantages and disadvantages. For example, a spiral-type inductor has a high Q value and a large mutual inductance, but the mutual inductance and coupling occur between the coils. For the 8-shaped inductor, since the directions of the induced magnetic fields of the two coils are opposite, the coupling and mutual inductance occur on the coupled magnetic field of the other coil. In addition, the 8-shaped inductor occupies a large area in the device.

SUMMARY

An aspect of this disclosure is to provide an inductor device. The inductor device includes a first ring structure and a second ring structure. The second ring structure is disposed within the first ring structure and paralleled to the first ring structure. A first open end of the first ring structure and a first open end of the second ring structure are selectively connected or unconnected.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
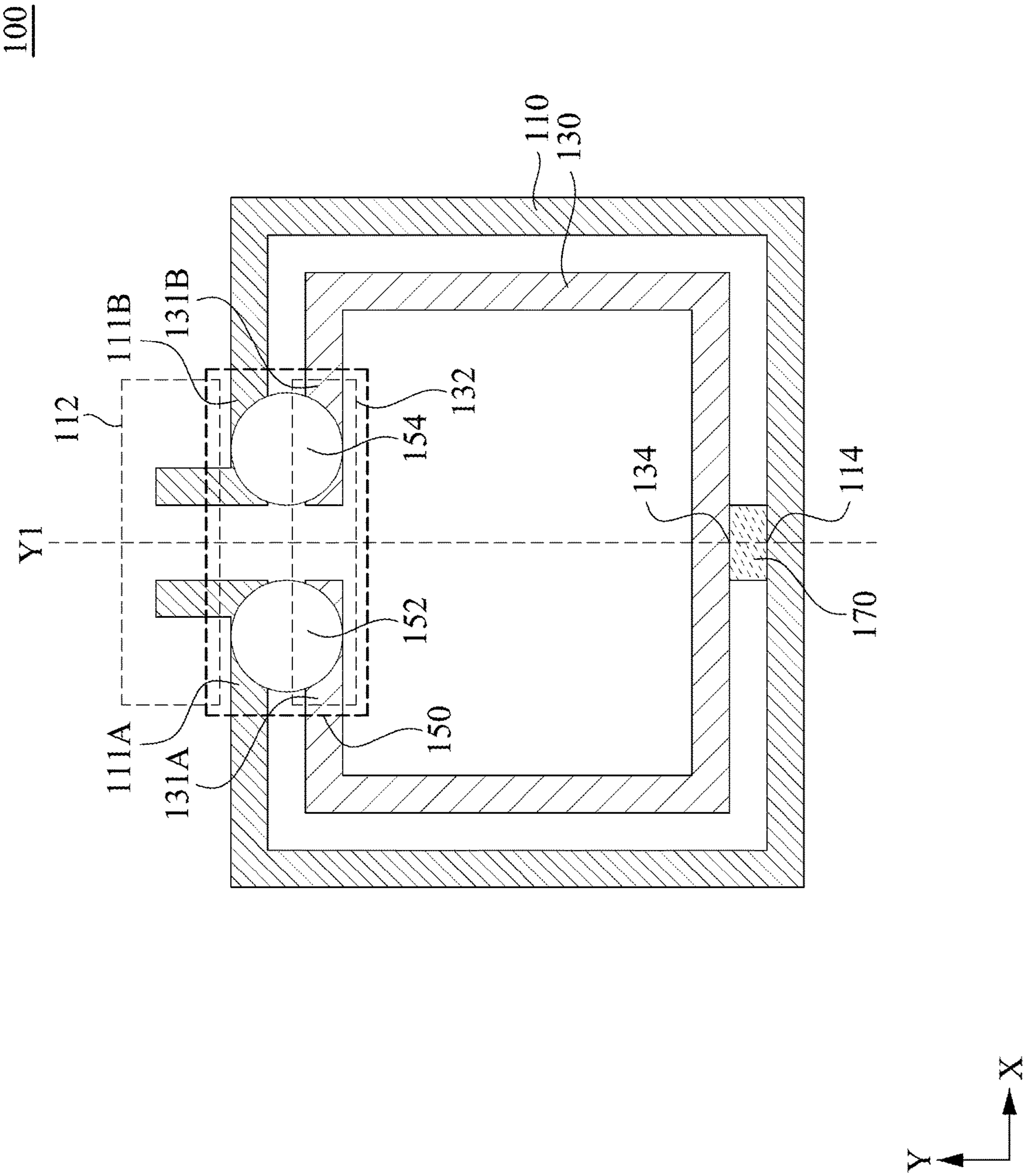
FIG. 1 is a schematic diagram illustrating an inductor device according to some embodiments of the present disclosure.

The following disclosure provides many different embodiments, or examples, for implementing different features of the invention. Specific examples of elements and arrangements are described lower than to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed lower than, or elsewhere in the specification, to provide additional guidance to the practitioner regarding the description of the invention.

The term “coupled” as used herein may also refer to “electrically coupled”, and the term “connected” may also refer to “electrically connected”. “Coupled” and “connected” may also refer to Refers to two or several elements cooperating or interacting with each other.

Reference is made to FIG. 1. FIG. 1 is a schematic diagram illustrating an inductor device 100 according to some embodiments of the present disclosure. The inductor device 100 includes a ring structure 110 and a ring structure 130. As shown in FIG. 1, structurally, the ring structure 130 is disposed within the ring structure 110. The ring structure 130 is paralleled to the ring structure 110. However, the embodiments of the present disclosure are not limited to ring structures 110 and 130 being paralleled as shown in FIG. 1. The ring structures 110 and 130 can also be two ring structures with the same or similar shapes. Furthermore, those skilled in the art can also disposed the structural relationship between the ring structures 110 and 130 according to actual needs.

The ring structure 110 includes an open end 112 and the ring structure 130 includes an open end 132. The open end 112 of the ring structure 110 and the open end 132 of the ring structure 130 are selectively connected or unconnected.

As illustrated in FIG. 1, the inductor device 100 further includes a connection piece 170. The connection piece 170 is coupled to the center point 114 of the ring structure 110 and the center point 134 of the ring structure 130.

In some embodiments, the inductor device 100 further includes the connector 150. The connector 150 is coupled to the open end 112 of the ring structure 110 and the open end 132 of the ring structure 130, so that the open end 112 of the ring structure 110 and the open end 132 of the ring structure 130 are selectively connected or unconnected.

In detail, the connector 150 further includes the switch 152 and the switch 154. The switch 152 is coupled to end 111A of the ring structure 110 and end 131A of the ring structure 130. The switch 154 is coupled to end 111B of the ring structure 110 and end 131B of the ring structure 130.

In some embodiments, when the ring structure 110 and the ring structure 130 are connected, the ring structure 110 and the ring structure 130 are paralleled and form a joint ring structure. For example, when the switch 152 is conducted, the end 111A of the ring structure 110 as shown in FIG. 1 is connected to the end 131A of the ring structure 130 through the switch 152. When the switch 154 is conducted, the end 111B of the ring structure 110 as shown in FIG. 1 is connected to the end 131B of the ring structure 130 through the switch 154. In some embodiments, through the operation of the switch 152 and the switch 154, the ring structure 110 can be selectively connected or unconnected from the ring structure 130.

In some embodiments, as illustrated in FIG. 1, the inductor device 100 is symmetrical to the axis Y1.

Figure 2:
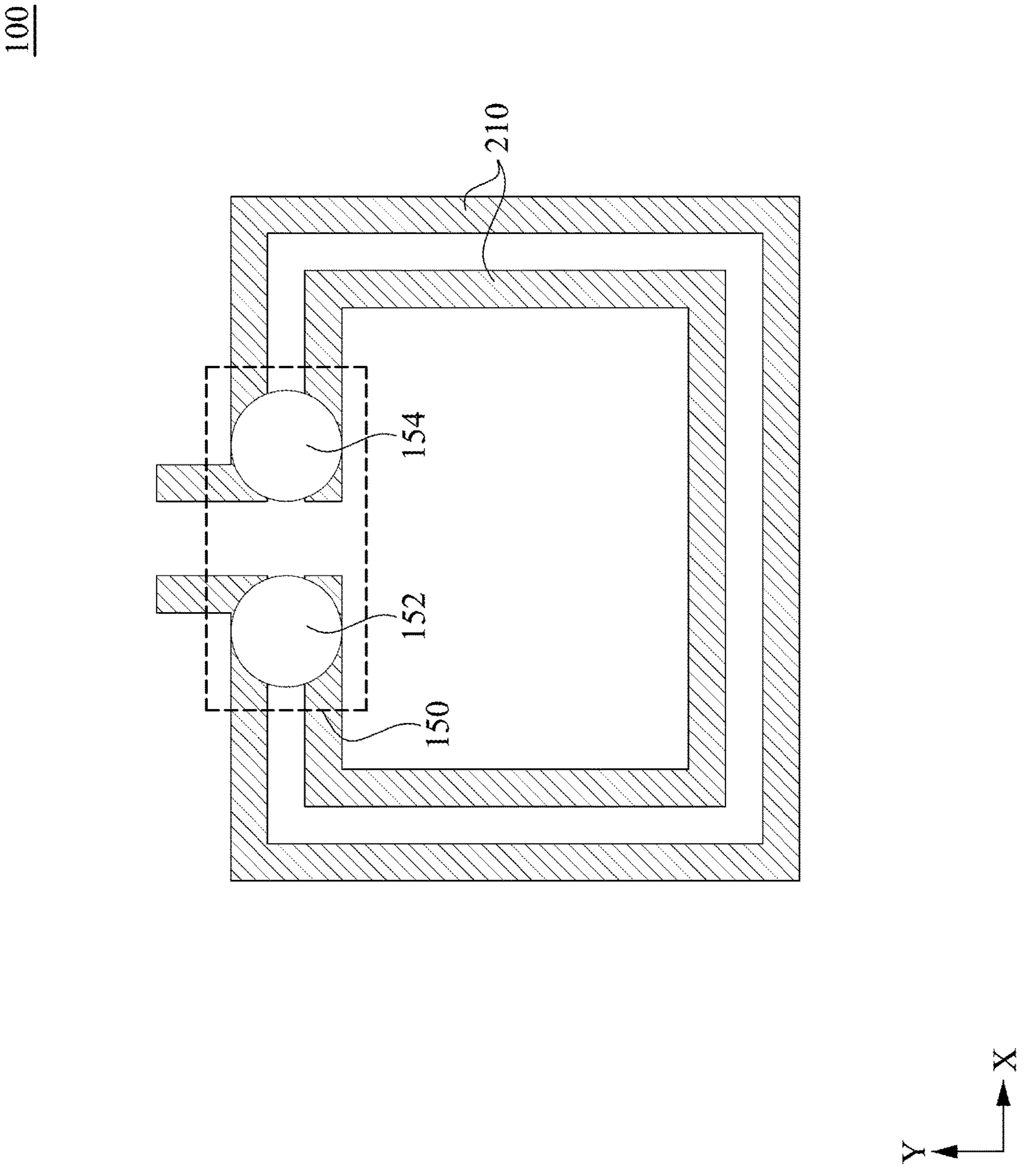
FIG. 2 is a schematic diagram illustrating an operation diagram of the inductor device in FIG. 1.

Reference is made to FIG. 2. FIG. 2 is a schematic diagram illustrating an operation diagram of the inductor device 100 in FIG. 1.

As illustrated in FIG. 2, when both of the switch 152 and the switch 154 are conducted, the ring structure 110 and the ring structure 130 form an inductor 210 together.

Figure 3:
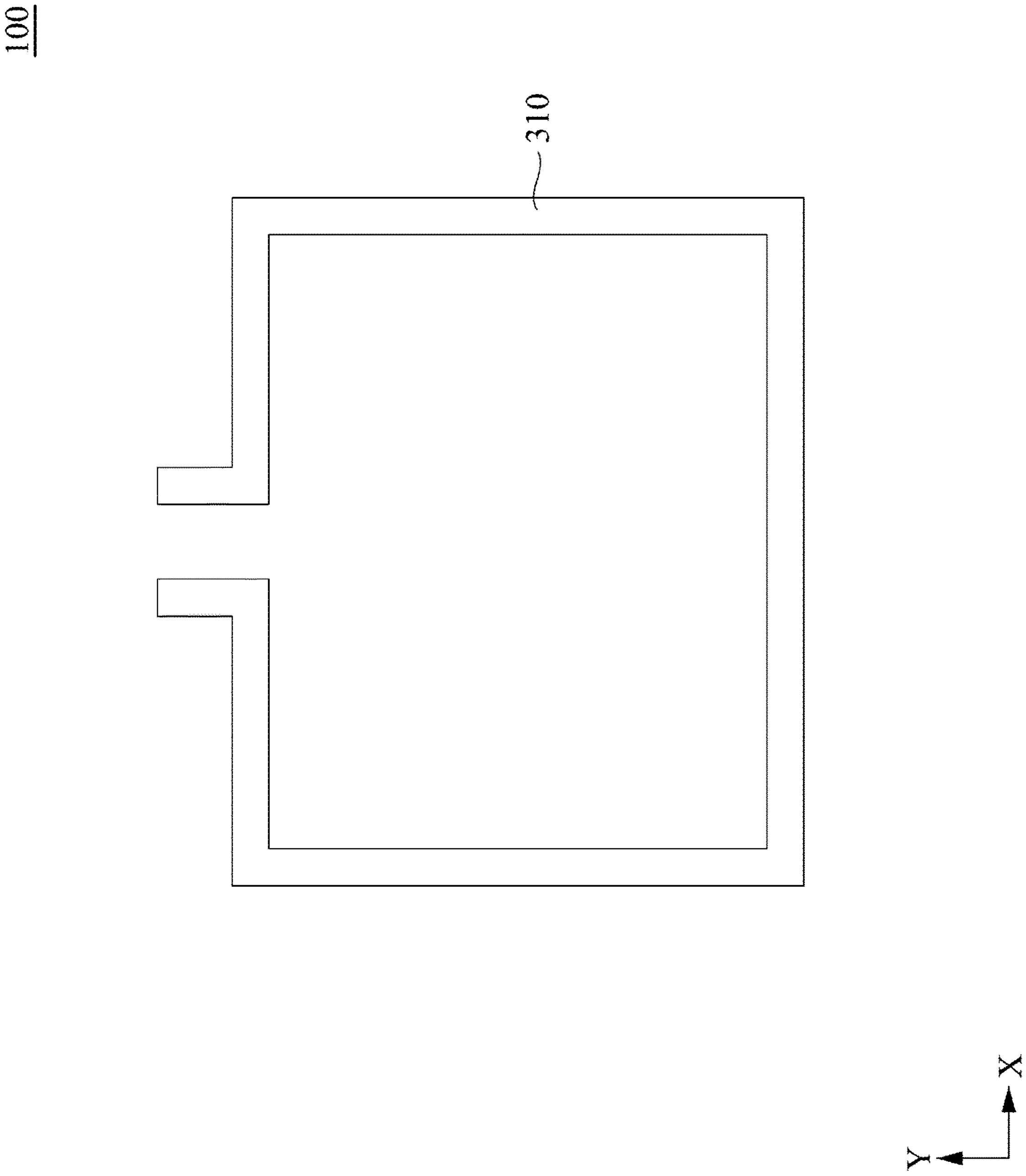
FIG. 3 is another schematic diagram illustrating an operation diagram of the inductor device in FIG. 1.

On the other hand, FIG. 3 is another schematic diagram illustrating an operation diagram of the inductor device 100 in FIG. 1. As illustrated in FIG. 3, when both of the switch 152 and the switch 154 in FIG. 1 are not conducted, the ring structure 110 alone forms an inductor 310 by itself.

The width of the inductor 210 in FIG. 2 is twice the width of the inductor 310 in FIG. 3, and the radius of the inductor 210 in FIG. 2 and the radius of the inductor 310 in FIG. 3 are also different. In this way, in the embodiments of the present disclosure, different inductor values can be achieved by switching between the switch 152 and the switch 154.

Reference is made to FIG. 1 again. In the inductor device 100, the switch 152 and the switch 154 are disposed at open end 112 of the ring structure 110 and open end 132 of the ring structure 130. In some other embodiments, the inductor device 100 may include more switches connected between the ring structure 110 and the ring structure 130, or the switches 152 and 154 may be disposed elsewhere on the ring structure 110 and the ring structure 130.

Figure 4:
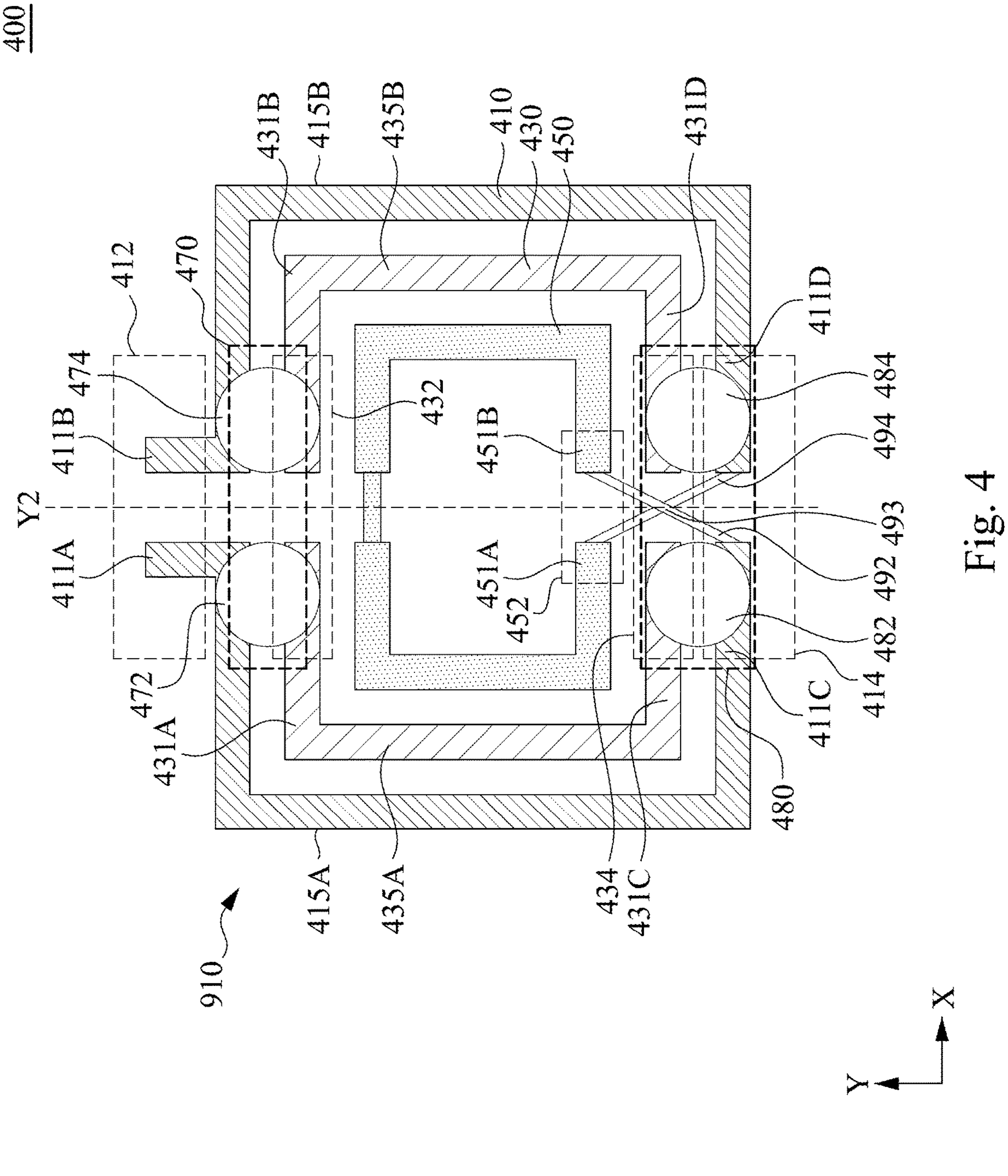
FIG. 4 is a schematic diagram illustrating another inductor device according to some embodiments of the present disclosure.

Reference is made to FIG. 4. FIG. 4 is a schematic diagram illustrating another inductor device 400 according to some embodiments of the present disclosure. As illustrated in FIG. 4, the inductor device 400 includes a ring structure 410, a ring structure 430 and a ring structure 450. The ring structure 430 disposed within the ring structure 410 and the ring structure 450 is disposed within the ring structure 430. The ring structure 410, the ring structure 430 and the ring structure 450 are paralleled to each other. However, the embodiments of the present disclosure are not limited to the ring structures 410, 430, 450 being paralleled as shown in FIG. 4, and the ring structures 410, 430, 450 can also be ring structures with the same or similar shapes. Furthermore, those skilled in the art can still follow the actual needs to set the structural relationship between the ring structures 410, 430, 450.

In some embodiments, the ring structure 410 further includes the half ring structures 415A and 415B. The ring structure 430 further includes the half ring structures 435A and 435B.

As illustrated in FIG. 4, the open end 414 of the ring structure 410 is coupled to the open end 452 of the ring structure 450.

In detail, the inductor device 400 in FIG. 4 further includes the connection piece 492 and the connection piece 494. One end of the connection piece 492 is connected to the end 411C of the half ring structure 415A, and the other end of the connection piece 492 is connected to the end 451B of the ring structure 450. One end of the connection piece 494 is connected to the end 411D of the half ring structure 4151B, and the other end of the connection piece 494 is connected to the end 451A of the ring structure 450. The connection piece 492 and the connection piece 494 cross-over at the intersection 493.

The inductor device 400 in FIG. 4 further includes the connector 470 and the connector 480. The connector 470 is coupled to the open end 412 of the ring structure 410 and the open end 432 of the ring structure 430. The connector 480 is coupled to open end 434 of the ring structure 430 and open end 414 of the ring structure 410.

The connector 470 includes the switch 472 and the switch 474. One end of the switch 472 is coupled to end 411A of the half ring structure 415A, and the other end of the switch 472 is coupled to end 431A of the half ring structure 435A. One end of the switch 474 is coupled to end 411B of the half ring structure 415B, and the other end of the switch 474 is coupled to end 431B of the half ring structure 435B.

The connector 480 includes the switch 482 and the switch 484. One end of the switch 482 is coupled to the end 431C of the half ring structure 435A, and the other end of the switch 482 is coupled to the end 411C of the half ring structure 415A. One end of the switch 484 is coupled to end 431D of the half ring structure 435B, and the other end of the switch 484 is coupled to end 411D of the half ring structure 415B.

As illustrated in FIG. 4, the switch 472 is located at one side of the open end 412 of the ring structure 410 and the open end 432 of the ring structure 430 (left side in the figure), and the switch 474 is located at the other side of open end 412 of the ring structure 410 and open end 432 of the ring structure 430 (right side in the picture). Furthermore, the switch 482 is located at one side of the open end 414 of the ring structure 410 and the open end 434 of the ring structure 430 (left side in the figure), and the switch 484 is located at the other side of the open end 414 of the ring structure 410 and the open end 434 of the ring structure 430 (right side in the picture).

In some embodiments, the switch 482 is located at one side of the intersection 493 (left side in the picture), and switch 484 is located at the other side of the intersection 493 (right side in the picture).

In some embodiments, when the connector 470 and the connector 480 are all conducted, that is, when the switch 472, the switch 474, the switch 482, and the switch 484 are all conducted, the ring structure 410 and the ring structure 430 are paralleled and form the joint ring structure 910, and the joint ring structure 910 and the ring structure 450 form an 8-shaped ring structure. On the other hand, when both the connector 470 and the connector 480 are not conducted, that is, when none of the switch 472, the switch 474, the switch 482, and the switch 484 is conducted, the ring structure 410 and the ring structure 450 form an 8-shaped ring structure, and the ring structure 430 doesn't work.

As described above, by changing the conduction state of the connector 470 and the connector 480, the width, radius, spacing, etc. of the ring structure formed by the ring structure 410 and the ring structure 430 can be changed, and the inductor value of the inductor device 400 can be changed accordingly.

In some embodiments, as shown in FIG. 4, the inductor device 400 is symmetrical to the axis Y2.

Figure 5:
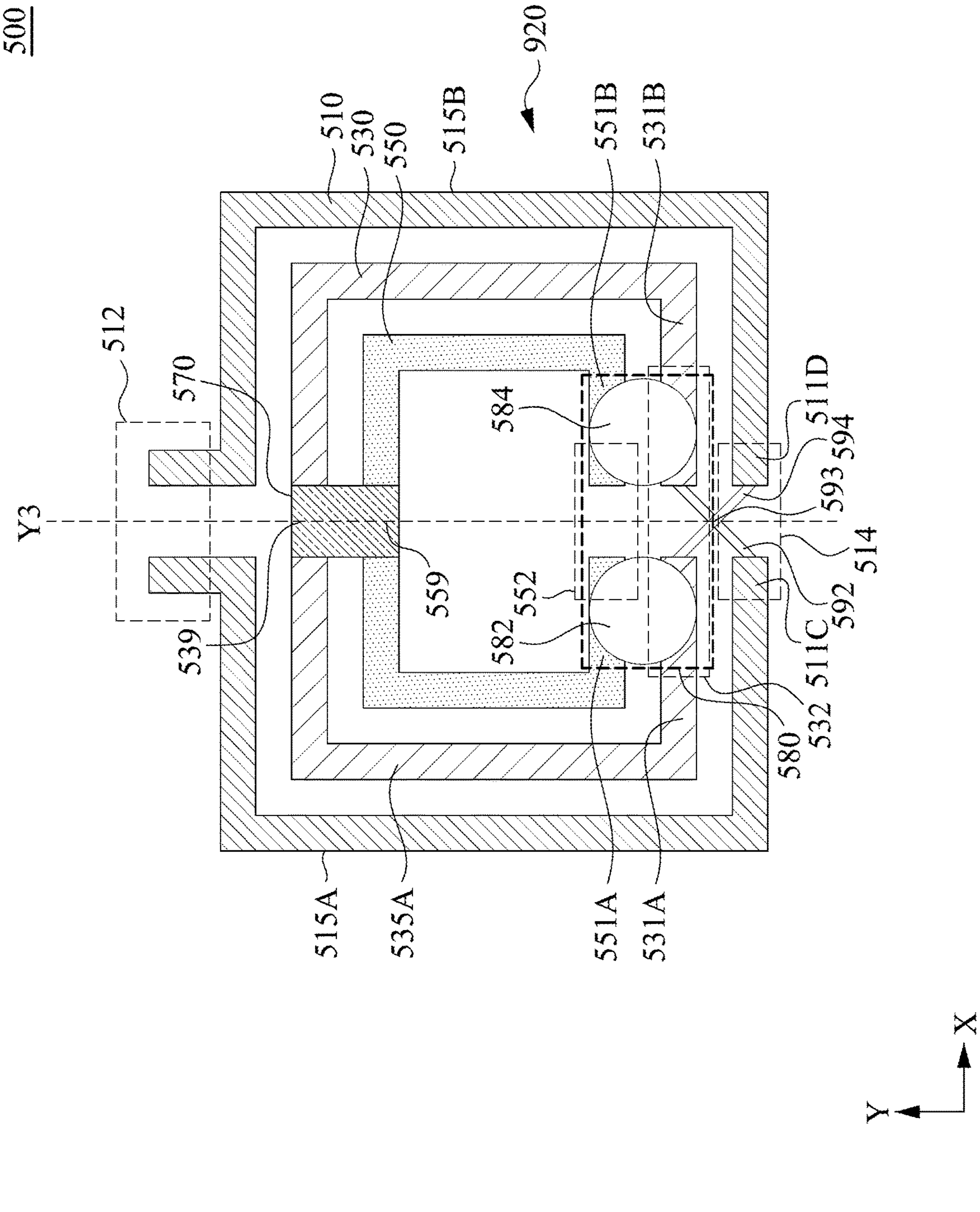
FIG. 5 is a schematic diagram illustrating another inductor device according to some embodiments of the present disclosure.

Reference is made to FIG. 5. FIG. 5 is a schematic diagram illustrating another inductor device 500 according to some embodiments of the present disclosure. As illustrated in FIG. 5, the inductor device 500 includes a ring structure 510, a ring structure 530 and a ring structure 550. The ring structure 530 is disposed within the ring structure 510 and the ring structure 550 is disposed within the ring structure 530. The ring structure 510, ring structure 530 and ring structure 550 are paralleled to each other. However, the embodiments of the present disclosure are not limited to the ring structures 510, 530, 550 being paralleled as shown in FIG. 5, and the ring structures 510, 530, 550 can also be ring structures with the same or similar shapes. Furthermore, those skilled in the art can still follow the actual needs to disposed the structural relationship between the ring structures 510, 530, 550.

In some embodiments, the ring structure 510 further includes the half ring structures 515A and 515B.

The ring structure 510 includes the open end 512 and the open end 514. The ring structure 530 includes the open end 532 and the ring structure 550 includes the open end 552.

As illustrated in FIG. 5, the open end 514 of the ring structure 510 is coupled to the open end 532 of the ring structure 530.

In detail, the inductor device 500 in FIG. 5 further includes the connection piece 592 and the connection piece 594. One end of the connection piece 592 is connected to the end 511C of the half ring structure 515A, and the other end of the connection piece 592 is connected to the end 531B of the ring structure 530. One end of the connection piece 594 is connected to the end 511D of the half ring structure 515B, and the other end of the connection piece 594 is connected to the end 531A of the ring structure 530. The connection piece 592 and the connection piece 594 crossover at the intersection 593.

The inductor device 500 in FIG. 5 further includes the connection piece 570. The connection piece 570 is coupled to the center point 539 of the ring structure 530 and the center point 559 of the ring structure 550.

The inductor device 500 in FIG. 5 further includes the connector 580. The connector 580 couples to open end 532 of the ring structure 530 and open end 552 of the ring structure 550.

The connector 580 includes the switch 582 and the switch 584. One end of the switch 582 is coupled to the end 531A of the ring structure 530, and the other end of the switch 582 is coupled to the end 551A of the ring structure 550. One end of the switch 584 is coupled to end 531B of the ring structure 530, and the other end of the switch 584 is coupled to end 551B of the ring structure 550.

As illustrated in FIG. 5, the switch 582 is located at one side of the open end 532 of the ring structure 530 and the open end 552 of the ring structure 550 (left side in the figure), and the switch 584 is located at the other side of the open end 532 of the ring structure 530 and the open end 552 of the ring structure 550 (right side in the figure).

In some embodiments, when the connector 580 is conducted, that is, when the switch 582 and the switch 584 are conducted, the ring structure 530 and the ring structure 550 are paralleled and form the joint ring structure 920, and the joint ring structure 920 and the ring structure 510 form an 8-shaped ring structure. On the other hand, when the connector 580 is not conducted, that is, when the switch 582 and the switch 584 are not conducted, the ring structure 510 and the ring structure 530 form an 8-shaped ring structure, and the ring structure 550 does not function.

As described above, by changing the conduction state of the connector 580, the width, radius, spacing, etc. of the ring structure formed by the ring structure 530 and the ring structure 550 can be changed, and the inductor value of the inductor device 500 can be changed accordingly.

In some embodiments, as illustrated in FIG. 5, the inductor device 500 is symmetric to the axis Y3.

The number, connection methods and positions of the switches in the above-mentioned embodiments are only for illustrative purposes, and the embodiments of the present disclosure are not limited thereto.

In the embodiment of the present application, the ring structure can be a quadrilateral structure, but the embodiment of the present application is not limited thereto. The ring structure can also be implemented by other polygonal structures, such as quadrilateral, hexagonal, octagonal, etc.

It should be noted that, in the embodiments of the present disclosure, the switches 152, 154, 482, 484, 472, 474, 582, and 584 can be controlled together, or the two can be a single connection device, and can be controlled separately depending on actual needs.

The inductor device of the embodiments of the present application can change the conduction status of the switch to change the width, radius, spacing, etc. of the ring structures formed between the ring structures, and the inductor value of the inductor device is changed. At the same time, the Q (quality) value of the inductor device can also be maintained.

Various functional elements are disclosed herein. To those of ordinary skill in the art, functional elements may be implemented by electrical circuits, whether it is a dedicated circuit, or a general-purpose circuit operating under the control of one or several processors and coded instructions.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An inductor device, comprising:

a first ring structure;

a second ring structure, disposed within the first ring structure and surrounded by the first ring structure;

a third ring structure, disposed within the second ring structure and surrounded by the second ring structure;

a first connection piece, coupled to a first end of a first half ring structure of the first ring structure and a first end of the third ring structure; and a second connection piece, coupled to a first end of a second half ring structure of the first ring structure and a second end of the third ring structure;

wherein a first open end of the first ring structure and a first open end of the second ring structure are selectively connected or unconnected, wherein when the first ring structure and the second ring structure form a joint ring structure, the joint ring structure and the third ring structure are connected by the first connection piece and the second connection piece.

2. The inductor device of claim 1, further comprising:

a first connector, coupled to the first open end of the first ring structure and the first open end of the second ring structure; and a second connector, coupled to a second open end of the first ring structure and a second open end of the second ring structure, wherein a first open end of the third ring structure is coupled to the second open end of the first ring structure.

3. The inductor device of claim 2, wherein the first connection piece and the second connection piece crossover at an intersection.

4. The inductor device of claim 3, wherein the first connector further comprises:

a first switch, coupled to a second end of the first half ring structure of the first ring structure and a first end of a first half ring structure of the second ring structure; and a second switch, coupled to a second end of the second half ring structure of the first ring structure and a first end of a second half ring structure of the second ring structure.

5. The inductor device of claim 4, wherein the first switch is located at a first side of the first open end of the first ring structure and the first open end of the second ring structure, and the second switch is located at a second side of the first open end of the first ring structure and the first open end of the second ring structure.

6. The inductor device of claim 3, wherein the second connector further comprises:

a first switch, coupled to the first end of the first half ring structure of the first ring structure and a first end of a first half ring structure of the second ring structure; and a second switch, coupled to the first end of the second half ring structure of the first ring structure and a first end of a second half ring structure of the second ring structure.

7. The inductor device of claim 6, wherein the first switch is located at a first side of the second open end of the first ring structure and the second open end of the second ring structure, and the second switch is located at a second side of the second open end of the first ring structure and the second open end of the second ring structure.

8. The inductor device of claim 6, wherein the first switch is located at a first side of the intersection, and the second switch is located at a second side of the intersection.

9. The inductor device of claim 3, wherein when both of the first connector and the second connector are conducted, the first ring structure and the second ring structure are paralleled and form the joint ring structure.

10. The inductor device of claim 1, wherein when the first ring structure and the second ring structure are connected, the first ring structure and the second ring structure form a joint ring structure.

* * * * *